United States Patent [19]

Takasaki et al.

[11] Patent Number: 4,986,999
[45] Date of Patent: Jan. 22, 1991

[54] ANTI-DENATURATION AGENT FOR EDIBLE PASTE PRODUCT

[75] Inventors: Takashi Takasaki, Karatsu; Reikichi Yanai, Osaka; Shigeru Amakawa, Nishinomiya; Yoichi Takizawa, Mishima; Akira Iwamoto, Karatsu, all of Japan

[73] Assignee: Nihon Bussan Kabushiki Kaisha, Karatsu, Japan

[21] Appl. No.: 219,747

[22] Filed: Jul. 18, 1988

[30] Foreign Application Priority Data

Jul. 20, 1987 [JP] Japan ................................ 62-178886

[51] Int. Cl.$^5$ ............................................ A23L 1/327
[52] U.S. Cl. .................................... 426/656; 426/56; 426/643
[58] Field of Search ...................... 426/56, 656, 643

[56] References Cited

U.S. PATENT DOCUMENTS

| | | | |
|---|---|---|---|
| 4,060,644 | 9/1977 | Braid | 426/643 |
| 4,303,685 | 12/1981 | Katoh | 426/643 |
| 4,342,790 | 8/1982 | Katoh | 426/643 |
| 4,861,602 | 8/1989 | Uchida | 426/56 |
| 4,863,746 | 9/1989 | Ucheda | 426/643 |
| 4,871,575 | 10/1989 | Callahan | 426/643 |
| 4,917,906 | 4/1990 | Lotz | 426/56 |

FOREIGN PATENT DOCUMENTS

| | | | |
|---|---|---|---|
| 55-71440 | 5/1980 | Japan | 426/643 |
| 55-88679 | 7/1980 | Japan | 426/643 |
| 169455 | 9/1984 | Japan | 426/643 |
| 60-43110 | 9/1985 | Japan | 426/643 |

*Primary Examiner*—Carolyn Paden
*Attorney, Agent, or Firm*—Charles E. Baxley

[57] ABSTRACT

An anti-denaturation agent for an edible paste product contains a protein decomposition extract obtained by decomposition of protein by proteinase and saccharides as essential active ingredients.

9 Claims, 1 Drawing Sheet

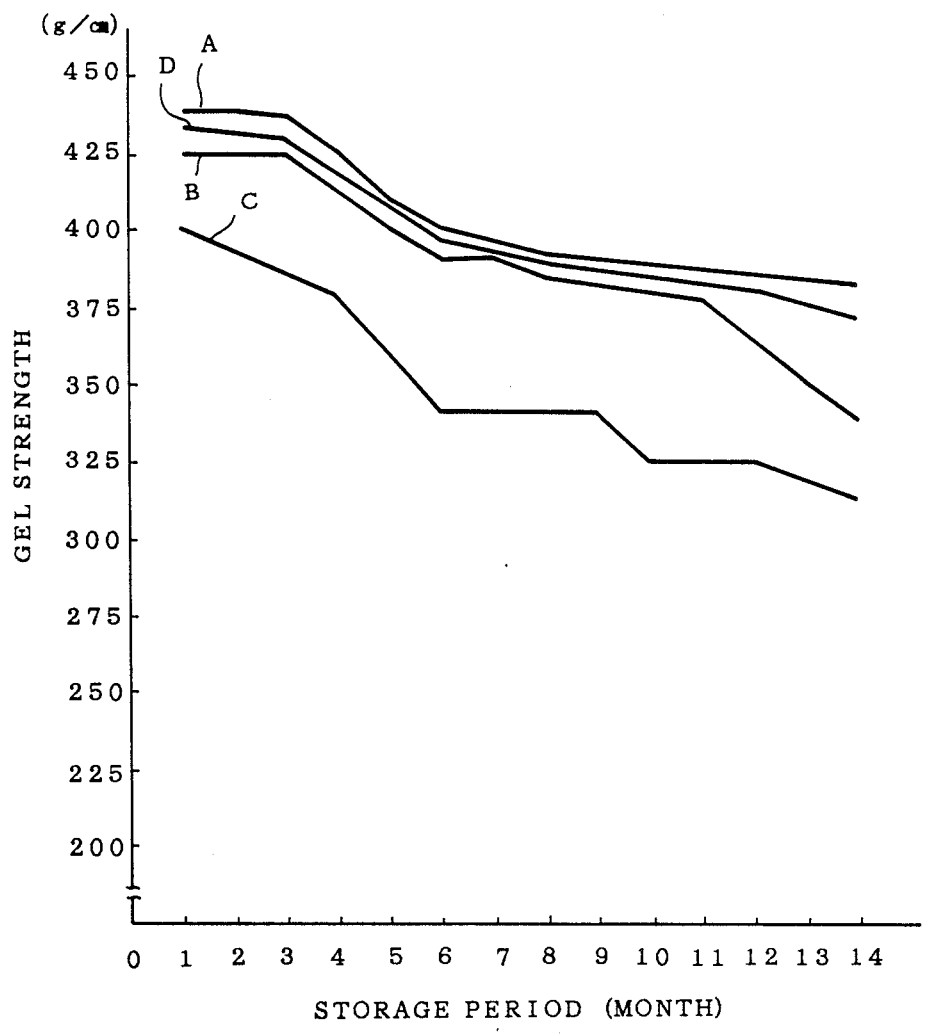

4,986,999

ANTI-DENATURATION AGENT FOR EDIBLE PASTE PRODUCT

BACKGROUND OF THE INVENTION

This invention relates to an anti-denaturation agent for preventing protein denaturation in fish or meat paste products, such as minced or ground fish, fish cake, fish sausage, meat ham or meat sausage.

In the fish or meat paste products, such as minced or ground fish, fish cake, fish sticks, fish sausage, meat ham or meat sausage, anti-denaturation agents are employed as additives for preventing denaturation of protein and for improving water retaining properties and resiliency of the ultimate products. An example of the anti-denaturation agents includes a synthetic additive such as polymerized phosphates. It is, however, feared in recent years that an excess intake of the polymerized phosphates may cause growth insufficiency, lesion to renal or urinary tubes, decomposition of calcium forming the main component of human bone, and other harms to a human body.

On the other hand, the salted ground fish, obtained by addition of table salt to the ground fish, is not harmful to a human body, but it has a drawback that it is subject to devil's tongue like gellation upon addition of salt, thus presenting difficulties in molding or addition of condiments for preparation of fish or meat paste products. The salted ground fish has an additional drawback that it can be preserved only for a shorter period of time than in the case of the ground fish containing a synthetic additive, such as the polymerized phosphates.

SUMMARY OF THE INVENTION

It is a principal object of the present invention to provide an anti-denaturation agent for edible paste products, such as fish or meat paste, in which pH-buffer function, water retaining properties, taste intensifying properties, nutrient value and intermolecular masking effect are activated in the paste products for preventing denaturation of protein without employing synthetic additives such as polymerized phosphates.

It is another object of the present invention to provide an anti-denaturation agent for edible paste products, wherein the above object can be accomplished in the entire manufacture process, that is, not only during preparation of the ground fish or meat but also during subsequent preparation of the paste products.

It is a further object of the present invention to provide an anti-denaturation agent for edible paste products which makes it possible to reduce the amount of the condiments added to the products on account of the taste intensifying properties of the anti-denaturation agent and to provide the paste products free from changes in color tone.

The above and other objects of the present invention will become more apparent from the following detailed description of the invention.

According to the present invention, there is provided an anti-denaturation agent for edible paste products, such as fish or meat pastes, comprising a protein decomposition extract and saccharides as essential active components. In the present specification, the term "protein decomposition extract" is used to indicate the extract obtained upon decomposition of protein by proteinase.

BRIEF DESCRIPTION OF THE DRAWING

The accompanying drawing is a chart showing the gel strength of the fish paste products obtained by addition of a synthetic additive, an anti-denaturation agent of the present invention and table salt to ground fish samples.

DESCRIPTION OF PREFERRED EMBODIMENTS OF THE INVENTION

The present invention will be explained in detail hereinbelow.

The present invention resides in an anti-denaturation agent for edible paste products, such as fish or meat paste, comprising an extract obtained by decomposition of protein with proteinase and saccharides as essential active components.

As the protein decomposition extracts of the present invention, fish and/or shellfish extracts and/or meat extracts, obtained by decomposition of the fish and/or shellfish and/or meat by proteinase may be employed. As an example for preparation of the fish and/or shellfish extracts, raw fish and/or shellfish, such as horse mackerel, mackerel, sardine, mackerel pike, oceanic bonito, atka mackerel, cod, cuttlefish, octopus, shrimp, oyster, corbicula, short-necked clam, sea mussel, species of ark shell, ark shell or hard clam, are charged into a reaction vessel, with or without pre-treatments, such as comminution for formation into a slurry. Immediately after charging, the temperature of the raw material is elevated to higher than 75° C. and preferably to higher than 80° C. for completely deactivating autolysis enzymes contained in the raw material and removing fishy smell or bad odor caused by the products of autolysis.

Then a *Bacillus subtilis* derived proteinase is added to the content in the vessel at 50° to 60° C. and at pH ranging from 6.0 to 7.0 and preferably from 6.0 to 6.5 for decomposing the protein contained in the fish and shellfish to the stage of proteoses.

The temperature of the resulting product is then elevated to not lower than 75° C. and preferably not lower than 80° C. for deactivating the *Bacillus subtilis* derived proteinase usually over 10 minutes to one hour and preferably over 15 to 30 minutes.

Then, without again adjusting the pH, a Kouji mold derived proteinase is added to the resulting product at 40° to 50° C. and at pH of 6.0 to 7.0 for decomposing the product into peptide consisting of amino acids having the molecular weight substantially not higher than 3000 and free amino acids. The decomposition time interval may be one to three hours and preferably about two hours. With the decomposition time interval less than one hour, the proteoses may be left and the specific amino acid composition employed in the present invention may not be obtained. With the decomposition time interval in excess of three hours, the function of preventing the protein denaturation as aimed at in the present invention may be lowered.

Then, using a centrifugal separator, for example, the produced liquid decomposition product is separated as conventionally into a fish and/or shellfish extract layer, an oil layer and undecomposed materials, such as bone pieces. The fish and shellfish extract is then filtered and concentrated under reduced pressure at a temperature not higher than 60° C.

The fish and/or shellfish extract is mainly composed of a peptide consisting of amino acids and free amino acids, such as glutamic acid, aspartic acid, lysine, alginine, glycine, alanine, leucine, proline, histidine, phenylalanine or cerine and are substantially composed of those amino acids having the molecular weight of not higher than 3000. As an example of preparation of the meat extract, edible portions of fowl, beef cattle or porker are cut to pieces of suitable size which pieces are then charged into a reaction vessel and heated to not lower than 60° C. to prevent deterioration of the raw materials while deactivating the autolysis enzymes.

The raw material is then adjusted to pH of 9.0 to 10.0 and admixed with an alkali-resistant proteinase. The resulting product is reacted under agitation so as to be decomposed to the stage of proteoses. The resulting product is then adjusted to pH of 5.0 to 6.0 and admixed with an acid-resistant proteinase at 50° to 60° C. so as to be reacted and decomposed to the stage of peptides. Thus, the proteoses and the oil that are bound to each other in an emulsified state in the preceding process stage are positively separated at this process stage into liquid protein and an oil layer. The temperature of the resulting product is then elevated to 90° C. to terminate the enzymatic decomposition. Then, using a three layer centrifugal separator, the resulting product is separated into oil, an aqueous solution and bone pieces and the liquid phase is concentrated in vacuum at less than 70° C. to produce the meat extract.

The above described methods for the preparation of the fish and/or shellfish extract and the meat extract employed as the protein decomposition extract in the present invention are merely illustrative and are not intended for limiting the invention. For example, although the proteinase is added and caused to act in two separate stages in the above described two illustrative processes it is also possible that proteinase be added and caused to act only in one stage and the operating conditions be changed accordingly to produce the protein decomposition extract. Also, as the proteinase, any enzymes capable of decomposing the protein may be used alone or in combination.

Examples of saccharides that may be used in the present invention include xylitol, sorbitol, glucose, galactose, fructose, lactose, saccharose, maltose, glycerine, ribose, xylose and raffinose.

In the present invention, the aforementioned protein decomposition extract and the saccharides, as the active components of the anti-denaturation agent, may be added to ground fish or ground meat at any process steps in the course of the preparation of the edible paste products and before being processed to the ultimate products. It is preferred that the addition of the above anti-denaturation agent be made after the fish or meat to be ground is dehydrated in a dehydrator or a screw press and then processed in a strainer for removal of small bones or muscles. It is also preferred that secondary components such as egg white, purified products of soybean protein, amino acids, organic acids or a mixture thereof be added in addition to the aforementioned essential active components. The purified products of soybean protein include lecithin, while the amino acids may include for example aspartic acid, glutamic acid, cysteine, glutathione, lysine, histidine, serine, alanine, hydroxyproline and glycine. The organic acids may include for example malonic acid, methylmalonic acid, maleic acid, glutaric acid, lactic acid, tartaric acid, gluconic acid, citric acid, $\gamma$-aminobutyric acid, DL-malic acid, L-malic acid, and adipic acid. These optional secondary components may be incorporated in the anti-denaturation agent or may be added at any stage during the preparation of the edible paste products. Preferably these secondary components are incorporated into the anti-denaturation agent.

The aforementioned active and optional secondary components are formed only by non-carcinogenetic natural products and may be employed as the extremely safe anti-denaturation agent for edible paste products.

The protein decomposition extract employed in the present invention has high viscosity so that the mobility of the intercellular free water contained in the ground fish or meat doped with the extract is restricted or inhibited so that the putrefaction otherwise caused by the microorgaisms contained in the free water is prevented. The activity of the microorganisms is also lowered since the extract is weakly acidic with the pH of the order of about 6.2. The protein decomposition extract employed in the present invention is completely free from bad smell while presenting sufficient taste and flavor and a high nutrient value so that the edible paste products admixed with the extract exhibit an improved taste and a high nutrient value.

It is preferred that the amount of addition of the protein decomposition extract as the aforementioned active component be not less than 0.1 part by weight and preferably 0.2 to 5 parts by weight to 100 parts by weight of the paste products. The amount of addition of a mixture of the protein decomposition extract and saccharides as the active components may preferably be 0.7 to 8 parts by weight and preferably 2.5 to 6 parts by weight to 100 parts by weight of the paste products. With the contents of the mixture less than 0.7 parts by weight, the properties of preventing denaturation of the paste products may not be exhibited, while the taste intensifying properties of the extract may be lowered. With the amount of the mixture larger than 8 parts by weight, it may occur that the ultimate paste products are not accepted by consumers because of too intense taste.

The amount of the aforementioned optional secondary component may be 0 to 30 parts and preferably 10 to 20 parts by weight to 100 parts by weight of the paste products. With the amount higher than 30 parts by weight, it may similarly occur that the ultimate paste products are not liked by consumers because of too intense taste.

According to the present invention, denaturation of the paste products is significantly reduced. Since artificial or synthetic additives are not used, the products are not harmful to health. In addition, the products are excellent both i taste and resiliency, while they are free from changes in color and may be stored for an extended period of time.

EXAMPLES OF THE INVENTION

The present invention will be explained in detail hereinbelow with reference to Examples and Comparative Examples.

EXAMPLE 1

40 kgs of dehydrated fish from medium to large sized Alaska pollack, caught at the adjacent seas of Abashiri, Hokkaido, Japan, were purchased and used as the sample fish as the second grade minced fish.

The protein decomposition extract was prepared in the following manner.

Whole bodies of 4 tons of mackerel were charged without any pre-treatment into a reaction vessel provided an agitator together with 4 tons of water, and the content of the vessel was heated to 80° C. After 15 minutes, the temperature of the content of the vessel was lowered to 55° C. 4 kgs of a *Bacillus subtilis* derived proteinase were added to the content of the vessel and the resulting mass was reacted at pH of 6.2 for 1.5 hours. Then, the temperature of the content in the vessel was elevated to 80° C. and maintained for 15 minutes, after which the temperature was lowered to 45° C. At this time, 2 kgs of a Kouji mould derived proteinase was added to the mass and the resulting mixture was reacted at that temperature for 2 hours at pH of 6.5.

Then, the mixture in the vessel was heated again to 80° C. to deactivate the proteinase. The reaction product was separated by a conventional method using a centrifugal separator into an extract layer, an oil layer and a residue containing bone pieces and unreacted materials. The extract layer was filtered and concentrated under reduced pressure at 60° C. to produce a mackerel extract.

To the above sample fish were then added the so-produced protein decomposition extract, saccharose and sorbitol and the whole mass was mixed with a silent cutter. The resulting product was separated into bundles each of 2.5 kgs and frozen at −30° C. The frozen product was thawed overnight in cartons at the room temperature of 10° to 15° C. The preparation and analysis of the fish cake were performed in accordance with the Unified National Inspection Method for Frozen Minched Fish. The following Table 1 shows several test examples and the accompanying drawing shows the measured values of the gel strength in these test examples. The curve B shows the gel strength with the lapse of storage period in accordance with Example 1. In measuring the gel strength, the Okada's gel strength meter was used, the plunger diameter was set to 5 mm, and the test pieces were cut into rings each 25 mm in diameter. The load weight W and the size of the recess L at the time the test pieces lost resistance and were fractured were measured and the gel strength was computed by W×L in g/cm.

EXAMPLE 2

The procedure of Example 1 was followed except that glutamic acid and lecithin were added to the components of Example 1 as the anti denaturation agent.

The following Table 1 and the accompanying drawing illustrate several test examples and the values of the gel strength obtained in these test examples, respectively.

EXAMPLE 3

The procedure of Example 2 was followed except that the amounts added were changed. The accompanying drawing illustrates the mean value of the gel strengths obtained in Examples 2 and 3 (curve D).

COMPARATIVE EXAMPLE 1

The procedure of Example 1 was followed except that saccharose, sorbitol and polymerized phosphates were added to the sample fish as the anti-denaturation agent. The accompanying drawing shows the value of the gel strength obtained in the test example (curve A).

COMPARATIVE EXAMPLE 2

The procedure of Example 1 was followed except that table salt was added to the sample fish as the anti-denaturation agent and thawing was carried out in a refrigerator at 0° C. The accompanying drawing shows the measured value of the gel strength obtained in the test example (curve C).

TABLE 1

|  | Saccharose (wt. part) | Sorbitol (wt. part) | Glutamic Acid (wt. part) | Lecithin (wt. part) | Polymerized Phosphates (wt. part) | Table Salt (wt. part) | Protein Decomposition Extract (wt. part) |
| --- | --- | --- | --- | --- | --- | --- | --- |
| Ex. 1 | 3 | 3 | — | — | — | — | 0.5 |
| Ex. 2 | 3 | 3 | 10 | 1.5 | — | — | 0.5 |
| Ex. 3 | 3 | 3 | 15 | 1.0 | — | — | 0.5 |
| Comp. Ex. 1 | 3 | 3 | — | — | 0.3 | — | — |
| Comp. Ex. 2 | 3 | 3 | — | — | — | 1.5 | — |

*Parts by weight are based on 100 parts by weight of the paste product

It is seen from the drawing that the gel strength was substantially unchanged when using the anti-denaturation agent for the edible paste product not containing artificial additive and containing only natural products in accordance with the present invention. It is also noticed that no changes in color were observed in the fish paste products produced in the Examples of the present invention.

EXAMPLES 4 to 12

The various ingredients indicated in Table 2 were added in amounts indicated in Table 2 to the sample fish in accordance with the Example 1 to produce the fish cake similarly to Example 1, and tests were conducted on the produced fish cake similarly to Example 1. The test results are also shown in Table 2. It is noticed that the extract obtained from the mixture of sardine and mackerel was used in the Examples 7 to 9 in place of the extract obtained from mackerel of Example 1 while the extract obtained from the mixture of ark shell and hard clam was used in the Examples 10 to 12 in place of the extract obtained from mackerel of Example 1.

TABLE 2

| Ex. No. | Saccharides (Parts by Weight) | Egg White (Parts by Weight) | Amino Acids (Parts by Weight) | Organic Acids (Parts by Weight) | Amount of Protein Decomposition Extract (Parts by Weight) | Gel Strength after 7 months | Gel Strength after 14 months |
| --- | --- | --- | --- | --- | --- | --- | --- |
| 4 | xylitol (3) | — | — | — | 0.2 | 383 | 340 |
| 5 | xylitol (1.5) saccharose (1.5) | (4) | cysteine (8) | malonic acid (1) | 1.0 | 399 | 398 |

TABLE 2-continued

| Ex. No. | Saccharides (Parts by Weight) | Egg White (Parts by Weight) | Amino Acids (Parts by Weight) | Organic Acids (Parts by Weight) | Amount of Protein Decomposition Extract (Parts by Weight) | Gel Strength after 7 months | Gel Strength after 14 months |
|---|---|---|---|---|---|---|---|
| 6 | maltose (4) | — | — | glutaric acid (1) | 2.5 | 400 | 398 |
| 7 | lactose (4) | — | lysine (10) | lactic acid (0.5) | 0.5 | 390 | 382 |
| 8 | fructose (3) | — | histidine (8) | citric acid (0.5) | 3.5 | 405 | 402 |
| 9 | saccharose (3) | — | hydroxy proline (7) | gluconic acid (0.5) | 0.5 | 385 | 382 |
| 10 | ribose (3) | — | aspartic acid (8) | adipic acid (0.5) | 0.5 | 383 | 370 |
| 11 | glucose (2) | — | glycine (11) | tartaric acid (0.5) | 4.5 | 415 | 410 |
| 12 | xylose (4) | (3) | glutathione (7) | L-malic acid (0.5) | 0.5 | 398 | 397 |

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. An anti-denaturation agent to be added to an edible paste product which comprises a protein decomposition extract obtained by decomposition of protein by proteinase and a saccharide as essential active ingredients, said protein decomposition extract containing a mixture of a peptide consisting of amino acids and having a molecular weight of not higher than 3000, and a mixture of free amino acids, said protein decomposition extract being obtained by elevating a temperature of a raw material selected from the group consisting of fish, shellfish, meat and mixtures thereof, to thereby deactivate autolysis enzymes, adding at least one proteinase to decompose said raw material into said mixture of peptide and said mixture of free amino acids and separating a liquid protein decomposition extract from an oil layer and undecomposed materials.

2. The agent according to claim 1 further comprising a secondary component selected from the group consisting of egg white, purified products of soybean protein, amino acids, organic acids and mixtures thereof.

3. The agent according to claim 2 wherein the agent includes up to 30 parts by weight of said secondary component to 100 parts by weight of said edible paste product.

4. The agent according to claim 2 wherein said purified products of soybean protein include lecithin.

5. The agent according to claim 2 wherein said amino acids are selected from the group consisting of aspartic acid, glutamic acid, cysteine, glutathione, lysine, histidine, cerine, alanine, hydroxyproline, glycine and mixtures thereof.

6. The agent according to claim 2 wherein said organic acids are selected from the group consisting of malonic acid, methylmalonic acid, maleic acid, glutaric acid, lactic acid, tartaric acid, gluconic acid, citric acid, γ-aminobutyric acid, DL-malic acid, L-malic acid, adipic acid and mixtures thereof.

7. The agent according to claim 1 wherein the agent includes not less than 0.1 part by weight of said protein decomposition extract to 100 parts by weight of the edible paste product.

8. The agent according to claim 1 wherein the agent includes 0.7 to 8 parts by weight of a mixture of said protein decomposition extract and the saccharide to 100 parts by weight of the edible paste product.

9. The agent according to claim 1 wherein said saccharide is selected from the group consisting of xylitol, sorbitol, glucose, galactose, fructose, lactose, saccharose, maltose, glycerine, ribose, xylose, raffinose and a mixtures thereof.

* * * * *